(12) United States Patent
Lee et al.

(10) Patent No.: US 11,198,396 B2
(45) Date of Patent: Dec. 14, 2021

(54) VEHICLE WITH EXPANDABLE SPACE

(71) Applicants: Hyundai Motor Company, Seoul (KR); Kia Motors Corporation, Seoul (KR)

(72) Inventors: Sang Heon Lee, Seoul (KR); Jin Ho Hwang, Seoul (KR); Dong Eun Cha, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 156 days.

(21) Appl. No.: 16/680,280

(22) Filed: Nov. 11, 2019

(65) Prior Publication Data
US 2020/0391661 A1    Dec. 17, 2020

(30) Foreign Application Priority Data
Jun. 11, 2019 (KR) .................. 10-2019-0068948

(51) Int. Cl.
| | | |
|---|---|---|
| *B60R 5/04* | (2006.01) | |
| *B60G 11/27* | (2006.01) | |
| *B62D 61/12* | (2006.01) | |
| *B60P 3/34* | (2006.01) | |

(52) U.S. Cl.
CPC .............. *B60R 5/041* (2013.01); *B60G 11/27* (2013.01); *B60P 3/34* (2013.01); *B62D 61/12* (2013.01)

(58) Field of Classification Search
CPC ........... B60R 5/041; B60G 11/27; B60G 3/01; B60G 2204/47; B60G 2300/402; B62D 61/12; B60P 3/34

USPC ........................................................ 296/26.09
See application file for complete search history.

(56) References Cited

U.S. PATENT DOCUMENTS

| | | | | | |
|---|---|---|---|---|---|
| 2,172,405 | A * | 9/1939 | Powell | .................... | B60R 5/041 |
| | | | | | 296/26.09 |
| 2,490,014 | A * | 12/1949 | Villiers | ................... | B60R 5/041 |
| | | | | | 296/26.09 |
| 3,004,790 | A * | 10/1961 | Mayer | ..................... | B60R 5/041 |
| | | | | | 296/26.09 |
| 4,228,936 | A * | 10/1980 | Rife | ........................ | B60R 11/06 |
| | | | | | 224/42.13 |
| 5,649,731 | A * | 7/1997 | Tognetti | .................. | B60P 1/003 |
| | | | | | 296/26.09 |
| 5,692,792 | A * | 12/1997 | Klar | ........................ | B60J 5/101 |
| | | | | | 296/26.02 |
| 6,328,366 | B1* | 12/2001 | Foster | .................... | B60P 1/431 |
| | | | | | 293/28 |

(Continued)

FOREIGN PATENT DOCUMENTS

| | | |
|---|---|---|
| KR | 19980047510 A | 9/1998 |
| KR | 101861241 B1 | 5/2018 |
| KR | 10-2019-0002075 A | 1/2019 |

*Primary Examiner* — Pinel E Romain
(74) *Attorney, Agent, or Firm* — Morgan, Lewis & Bockius LLP

(57) ABSTRACT

A vehicle with an expandable space, may include a fixed floor being a floor of the vehicle; a moving floor slidably inserted into the fixed floor, being slid inside or outside the vehicle by operation of a driving unit, and forming the expanding space outside the vehicle by forming an outside floor connected to the fixed floor when sliding out; and assistant wheel assemblies, each having an assistant wheel that comes in contact with the ground when deployed and that separates from the ground when stowed.

18 Claims, 8 Drawing Sheets

(56) References Cited

U.S. PATENT DOCUMENTS

| | | | |
|---|---|---|---|
| 6,644,707 B2* | 11/2003 | McLaughlin | B60R 5/041 |
| | | | 224/311 |
| 6,659,525 B2* | 12/2003 | Delavalle | B60R 5/041 |
| | | | 296/26.08 |
| 7,140,657 B2* | 11/2006 | Cuma | B60J 5/101 |
| | | | 296/26.1 |
| 7,178,823 B1 | 2/2007 | Tai | |
| 7,914,060 B2* | 3/2011 | Scribner | B60P 3/40 |
| | | | 296/26.08 |
| 8,534,735 B2* | 9/2013 | McManus | B62D 47/003 |
| | | | 296/26.08 |
| 8,585,116 B2* | 11/2013 | King | B62D 47/003 |
| | | | 296/24.33 |
| 2005/0189778 A1 | 9/2005 | De Gaillard | |
| 2010/0001029 A1* | 1/2010 | Tai | B60R 9/06 |
| | | | 224/499 |
| 2018/0050626 A1 | 2/2018 | Delp et al. | |
| 2018/0087288 A1* | 3/2018 | Boettiger | B60P 3/34 |
| 2020/0369212 A1* | 11/2020 | Zeuner | B60P 1/42 |

* cited by examiner

VEHICLE WITH EXPANDABLE SPACE

CROSS REFERENCE TO RELATED APPLICATION

The present application claims priority to Korean Patent Application No. 10-2019-0068948, filed Jun. 11, 2019, the entire contents of which is incorporated herein for all purposes by this reference.

BACKGROUND OF THE INVENTION

Field of the Invention

The present invention relates to a vehicle with an expandable space, the internal space of which is expanded by expanding a portion of the vehicle body outward.

Description of Related Art

Recently, as people who enjoy outdoor activities increase with an increase of leisure activities, vehicles have come to have functions not only of providing simple transportation, but also of providing a resting space. Furthermore, there is the case in which a working space for working outdoors is required.

Although there are some differences depending on the kinds and sizes of thereof, most vehicles have provided only spaces for passengers to sit in. Accordingly, most vehicles do not have a sufficient space for resting or working. Furthermore, the space for loading objects into vehicles has been limited, it has been possible to load some objects into the trunks of passenger cars or vans, but difficult to load a large amount of objects therein.

Considering the circumstance without sufficient internal spaces secured in vehicles, there is a demand for a new type of vehicle having a sufficient space for resting or working in the vehicle. Furthermore, there is a demand for a new concept vehicle which may be loaded with a large number of objects as necessary.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle with an expandable space of which the internal space is expanded by expanding a portion of the vehicle body outward.

In view of an aspect, a vehicle with an expandable space according to an exemplary embodiment of the present invention may include: a fixed floor being a floor of the vehicle; a moving floor slidably inserted into the fixed floor, being slid inside or outside the vehicle by operation of a driving unit, and forming the expanding space outside the vehicle by forming an outside floor connected to the fixed floor when sliding out; and assistant wheel assemblies, each having an assistant wheel that comes in contact with the ground when deployed and that separates from the ground when stowed.

The assistant wheel assembly may include assistant links and an assistant wheel, the assistant link may have an end portion rotatably connected to the bottom portion of the moving floor and the other end portion fastened to the assistant wheel, and the assistant wheel may be brought in contact with the ground by a rotation of the assistant links.

The moving floor may slide forward and rearward with respect to the vehicle under an upper clam shell, and may form the outside floor connected to the fixed floor when sliding rearward thereof, forming an expanded space outside the vehicle.

The vehicle may further include a lower clam shell which is coupled to a rear of the moving floor, has a panel shape extending in a width direction of the vehicle, and closes the rear of the vehicle in cooperation with the upper clam shell when the moving floor is slidably inserted into the fixed floor.

The lower end portion of the lower clam shell may be rotatably coupled to an upper end portion of a rear of the moving floor, and when the lower end portion of the lower clam shell is rotated, the lower clam shell may rotate rearward from the vehicle, forming a floor extending from a top portion of the moving floor.

When the expanded space is formed, the moving floor may be slid rearward from the vehicle while the upper clam shell opens, and the assistant links may be rotated, so that the assistant wheels may come in contact with the ground.

When the expanded space is closed, the moving floor may be slid forward with respect to the vehicle while the upper clam shell closes, and the assistant links may be rotated, so that the assistant wheels may be separated from the ground.

When the moving floor is slidably inserted into the fixed floor, the assistant links may be mounted to be inclined downward toward the rear of the vehicle such that the assistant wheels and a main tire axle do not interfere with each other, and when the moving floor slides rearward thereof, the assistant links may be rotated and the assistant wheels come in contact with the ground.

The assistant links may be coupled to the moving floor through ball bearings and may be rotated by a rotation of the ball bearings.

A through-hole may be formed through a portion of each of the ball bearings, and when the assistant links are rotated with the ball bearings and the assistant wheels come in contact with the ground, coupling pins may be fitted into the through holes of the ball bearings by sliding on the moving floor.

The assistant link may include an upper link and a lower link, the upper link may have an end portion coupled to the bottom portion of the moving floor and the other end portion inserted into the lower link, and the lower link may be slid by a rotation of the upper link, whereby a length of the assistant link may be adjusted.

The lower link may be a gas cylinder.

The vehicle may further include a separation panel which is mounted on the fixed floor, has a panel shape extending in the width direction of the vehicle, and slides forward or rearward with respect to the vehicle.

The separation panel may slide rearward with respect to the vehicle when the moving floor slides rearward thereof, closing the rear of the vehicle in cooperation with the upper clam shell.

When the moving floor slides rearward and the expanded space is formed, a moving seat mounted in an internal space of the vehicle may be moved onto the moving floor.

According to the vehicle with an expandable space of the present invention, it is possible to expand the internal space of the vehicle by expanding the vehicle body itself of the vehicle to the outside.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
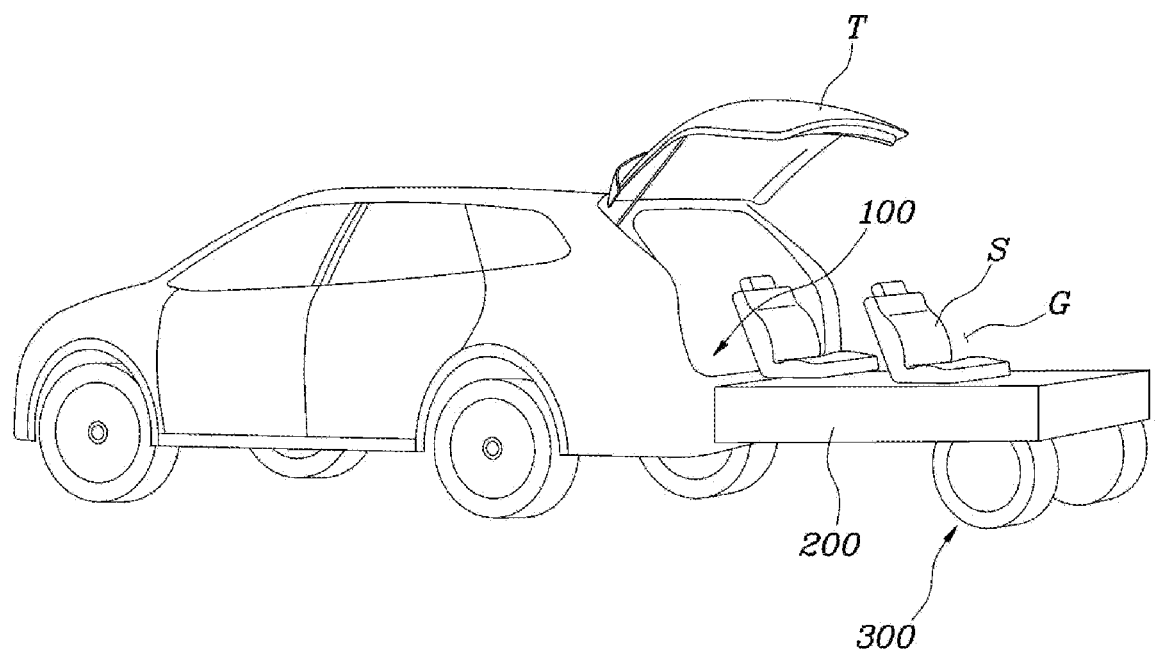
FIG. 1 is a view showing a vehicle with an expandable space according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
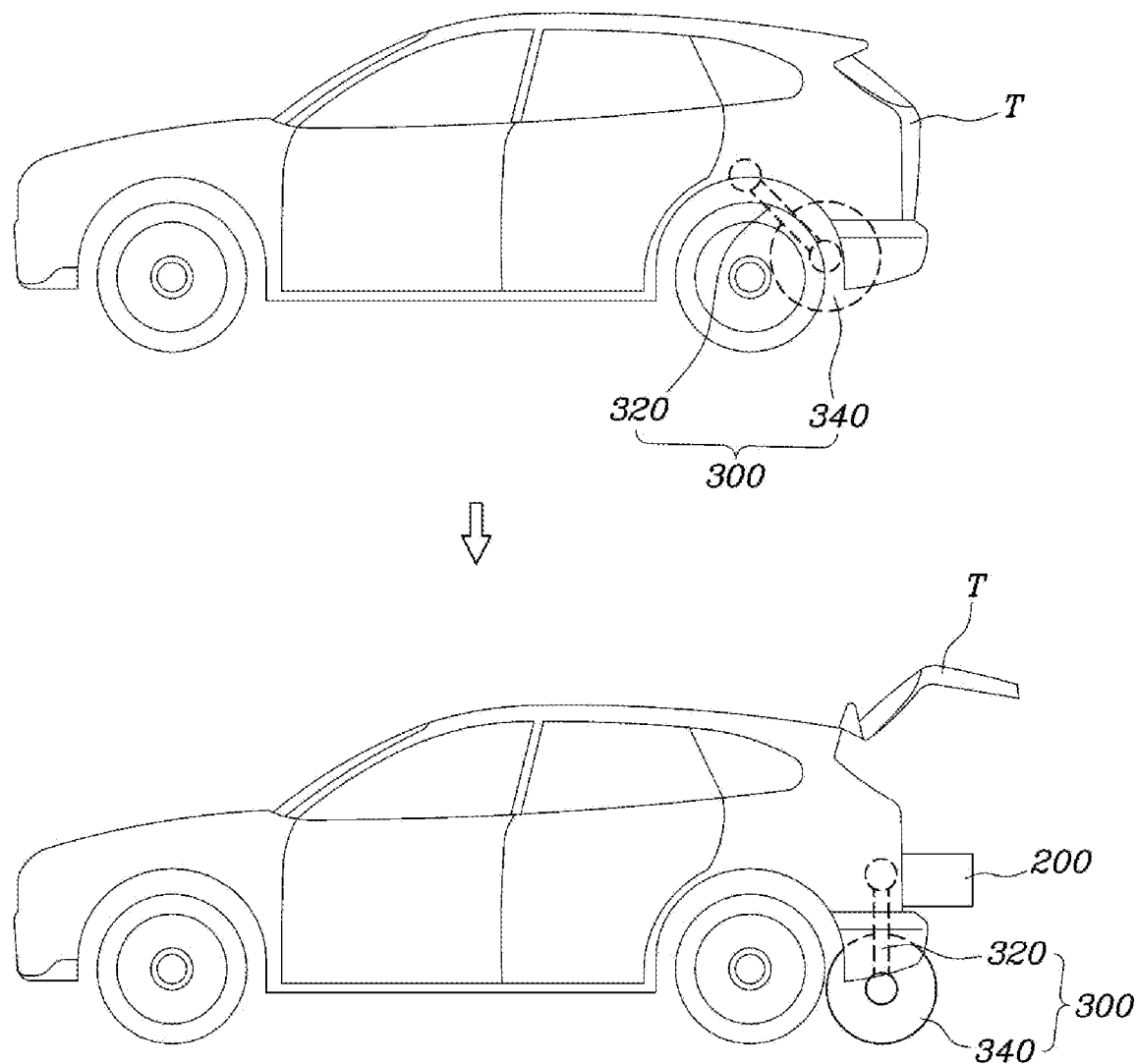
FIG. 2 is a view showing a moving floor of the vehicle with an expandable space according to an exemplary embodiment of the present invention.
Figure 3:
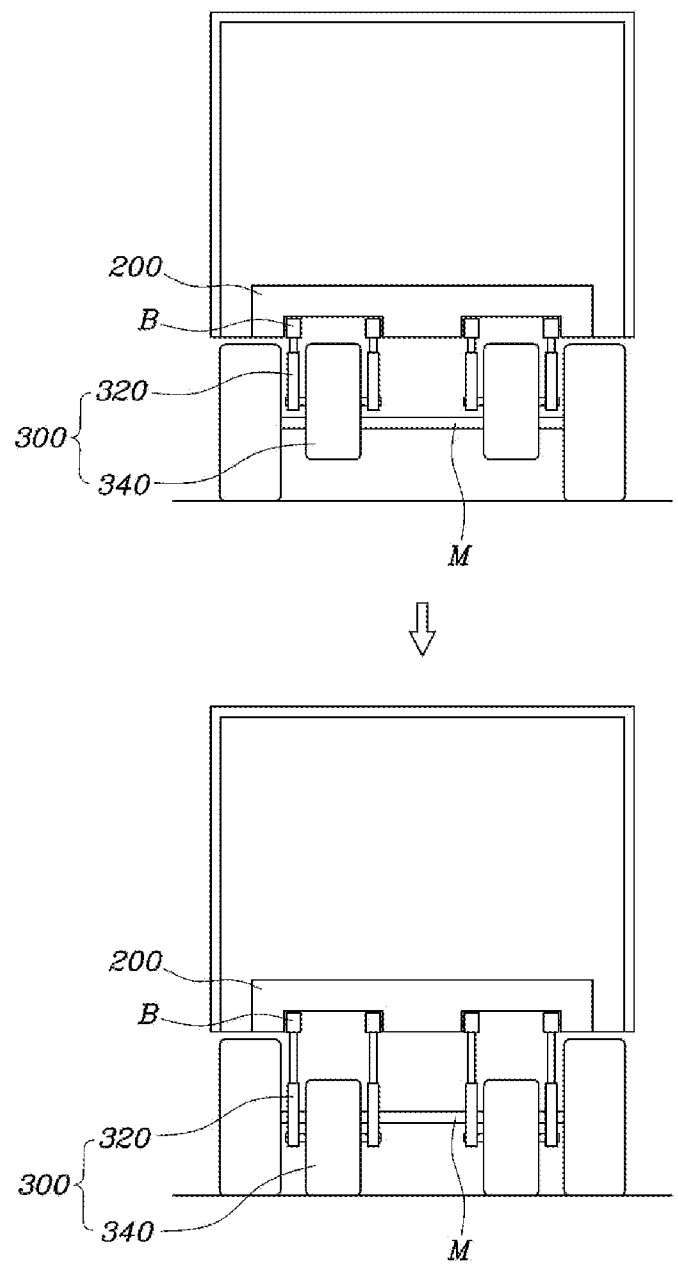
FIG. 3 is a view showing the rear side of the vehicle with an expandable space according to an exemplary embodiment of the present invention.
Figure 4:
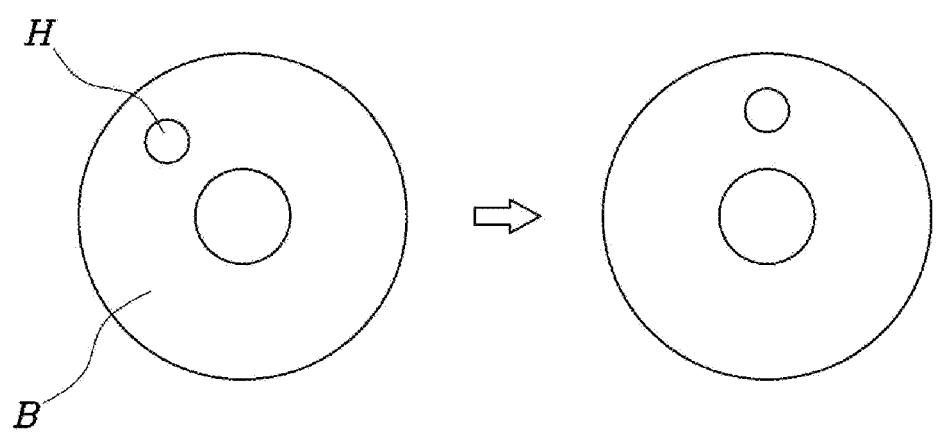
FIG. 4 is a view showing a ball bearing of the vehicle with an expandable space according to an exemplary embodiment of the present invention.
Figure 5:
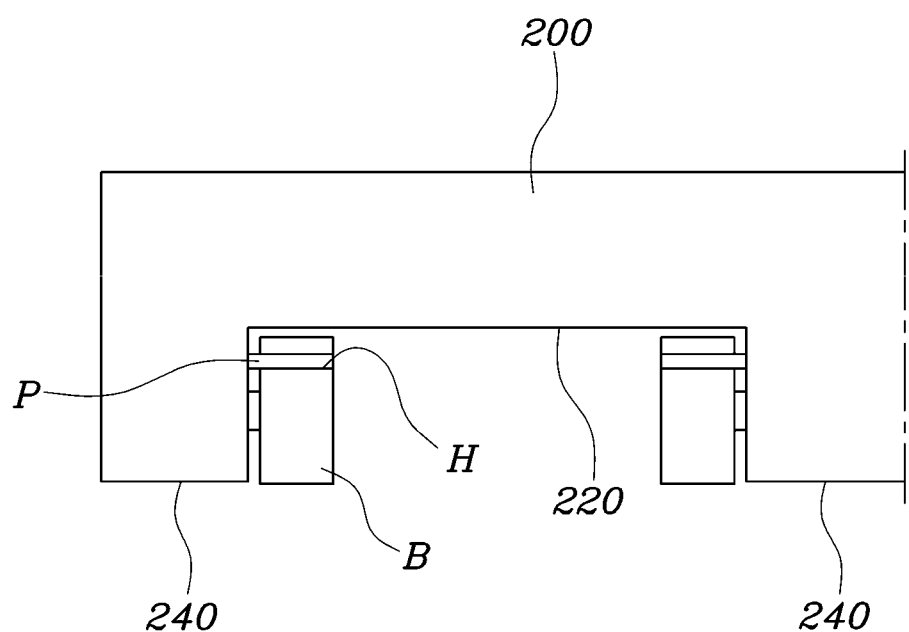
FIG. 5 is a view showing a coupling pin of the vehicle with an expandable space according to an exemplary embodiment of the present invention.
Figure 6:
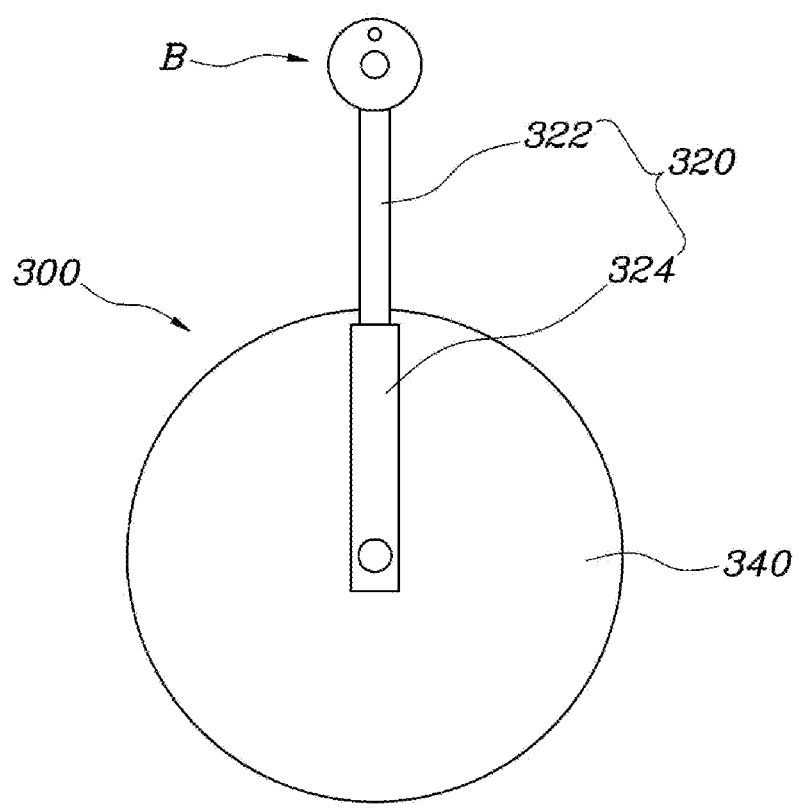
FIG. 6 is a view showing an assistant wheel assembly of the vehicle with an expandable space according to an exemplary embodiment of the present invention.
Figure 7:
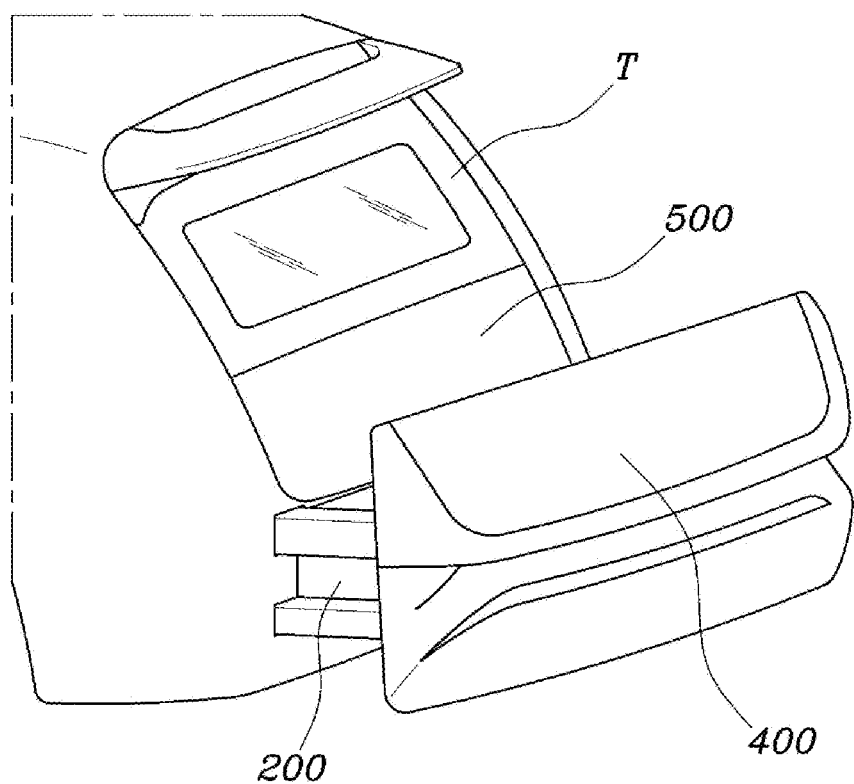
FIG. 7 and FIG. 8 are views showing a lower clam shell of a vehicle with an expandable space according to various exemplary embodiments of the present invention.
Figure 8:
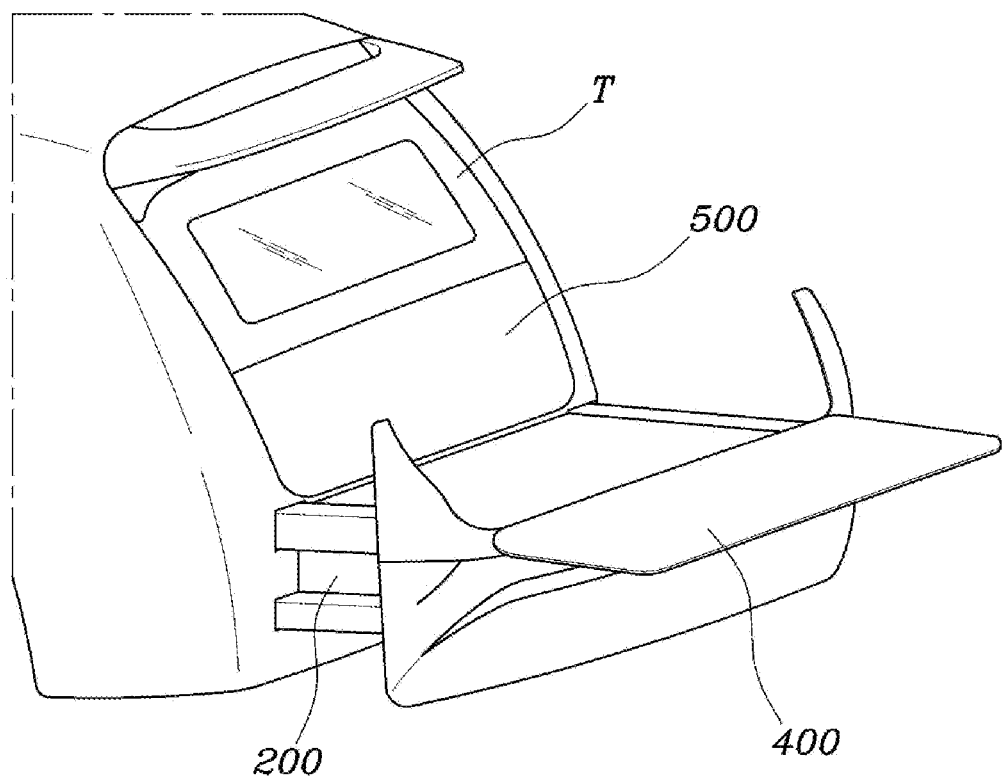

FIG. 1 is a view showing a vehicle with an expandable space according to an exemplary embodiment of the present invention, FIG. 2 is a view showing a moving floor of the vehicle with an expandable space according to an exemplary embodiment of the present invention, FIG. 3 is a view showing the rear side of the vehicle with an expandable space according to an exemplary embodiment of the present invention, FIG. 4 is a view showing a ball bearing of the vehicle with an expandable space according to an exemplary embodiment of the present invention, FIG. 5 is a view showing a coupling pin of the vehicle with an expandable space according to an exemplary embodiment of the present invention, FIG. 6 is a view showing an assistant wheel assembly of the vehicle with an expandable space according to an exemplary embodiment of the present invention, and FIG. 7 and FIG. 8 are views showing a lower clam shell of a vehicle with an expandable space according to various exemplary embodiments of the present invention.

As in FIGS. 1, 2, and 7, a vehicle with an expandable space according to an exemplary embodiment of the present invention includes: a fixed floor 100 which is the floor of the vehicle; a moving floor 200 inserted into the fixed floor 100, being slid inside or outside the vehicle by operation of a driving unit, and forming an expanding space G outside the vehicle by forming an outside floor connected to the fixed floor when sliding out; and assistant wheel assemblies 300 each having an assistant wheel 340 that comes in contact with the ground when deployed and that separates from the ground when stowed.

According to an exemplary embodiment of the present invention, the fixed floor 100 that forms the floor inside a vehicle is provided. The moving floor 200 is slidably inserted into the fixed floor 100 and slides inside and outside the vehicle by operation of the driving unit. When the moving floor 200 slides outside the vehicle, the moving floor 200 forms an outside floor connected to the fixed floor 100, forming an expanded space G outside the vehicle. Accordingly, there is an advantage that when a passenger needs a space for resting or working, he/she can utilize a space by stopping the vehicle and then setting the expanded space G.

Furthermore, the present invention includes the assistant wheel assemblies 300 each having the assistant wheel 340 that comes in contact with the ground when deployed and that separates from the ground when stowed. Accordingly, when the moving floor 200 slides out and the expanded space G is formed, the assistant wheels 340 come in contact with the ground with the assistant wheel assemblies 300 deployed to support the moving floor 200. Furthermore, when the assistant wheel assemblies 300 are stowed, the assistant wheels 340 are separated from the ground.

In more detail, as in FIGS. 1, 2, and 7, the assistant wheel assembly 300 includes assistant links 320 and an assistant wheel 340. An end portion of the assistant link 320 is rotatably connected to the bottom portion of the moving floor 200. The other end portion of the assistant link 320 is fastened to the assistant wheel 340. The assistant wheel 340 is brought in contact with the ground by a rotation of the assistant links 320 of the assistant wheel assembly 300. Accordingly, the assistant wheels 340 of the assistant wheel assemblies 300 come in contact with the ground, being able to support the moving floor 200. When the moving floor 200 slides outside the vehicle and the expanded space G is formed, the moving floor 200 is supported by the assistant wheel assemblies 300, so there is an advantage that structural stability is increased.

According to the vehicle with an expandable space of the present invention, as in FIG. 1 and FIG. 2, the moving floor 200 slides forward and rearward with respect to the vehicle under an upper clam shell T, and forms an outside floor connected to the fixed floor 100 when sliding rearward thereof, forming an expanded space G outside the vehicle.

The upper clam shell T means the rear door of a station wagon, an SUV, or a pickup truck, and opens or closes the rear of a vehicle. The moving floor 200 is slidably inserted into the fixed floor 100 or is deployed outside the vehicle from the fixed floor 100 by sliding forward or rearward with respect to the vehicle under the upper clam shell. When the moving floor 200 slides rearward thereof, the moving floor 200 forms an outside floor connected to the fixed floor 100, forming an expanded space G outside the vehicle. Furthermore, the moving floor 200 may be supported by the assistant wheel assemblies 300. Furthermore, even though the expanded space G is formed, the vehicle can travel through the assistant wheels 340. Therefore, according to an exemplary embodiment of the present invention, there is an advantage that the expanded space G may be used as a resting space or a working space when the vehicle is stopped and can also be used as a loading space by loading objects therein when the vehicle travels.

The vehicle with an expandable space of the present invention, as shown in FIGS. 7 and 8, may further include a lower clam shell 400 which is coupled to the rear of the moving floor 200, has a panel shape extending in the width direction of the vehicle, and closes the rear of the vehicle in cooperation with the upper clam shell T when the moving floor 200 is slidably inserted into the fixed floor 100. In more detail, the lower end portion of the lower clam shell 400 is rotatably coupled to the upper end portion of the rear of the moving floor 200. Furthermore, when the lower end portion of the lower clam shell 400 is rotated, the lower clam shell 400 rotates rearward from the vehicle, being able to form a floor extending from the top portion of the moving floor 200.

A lower clam shell 400 is provided in an exemplary embodiment of the present invention. The lower clam shell 400 has a panel shape extending in the width direction of the vehicle and is coupled to the rear of the moving floor 200. When the moving floor 200 slides forward with respect to the vehicle and inserted into the fixed floor 100, the lower clam shell 40 closes the rear of the vehicle in cooperation with the upper clam shell. The upper clam shell T can open or close the rear of the vehicle in cooperation with the lower clam shell 400. That is, FIG. 7 and FIG. 8 show that the moving floor 200 has been slid rearward thereof, but when the moving floor 200 has been slid forward, the upper clam shell T and the lower clam shell 400 may close together the rear of the vehicle.

The lower clam shell 400 is rotatably coupled at the lower end portion to the upper end portion of the rear of the moving floor 200. When the lower end portion thereof is rotated, the lower clam shell 400 is rotated rearward from the vehicle, being able to form the outside floor extending from the top portion of the moving floor 200. Accordingly, when the lower clam shell 400 is positioned perpendicular to the moving floor 200, as in FIG. 7, the lower clam shell 400 somewhat closes the rear space of the vehicle, so even though objects are loaded, the objects may be prevented from dropping behind the vehicle when the vehicle is driven. When the lower clam shell 400 forms the continuous outside floor with the moving floor 200, as in FIG. 8, the rear space of the vehicle is somewhat open, so there is an advantage that it is possible to more conveniently load objects when loading objects.

According to the vehicle with an expandable space of the present invention, as in FIG. 1, FIG. 2, and FIG. 3, when the expanded space G is formed, the upper clam shell T is open, the moving floor 200 slides rearward from the vehicle, and the assistant links 320 are rotated, so that the assistant wheels 340 come in contact with the ground. That is, when the moving floor 200 slides rearward from the vehicle while the upper clam shell T opens, the assistant links 320 are rotated to support the moving floor 200, so that the assistant wheels 340 come in contact with the ground.

According to the vehicle with an expandable space of the present invention, as in FIG. 1, FIG. 2, and FIG. 3, when the expanded space G is closed, the moving floor 200 slides forward with respect to the vehicle while the upper clam shell T closes, and the assistant links 320 are rotated, so that the assistant wheels 340 may be separated from the ground. That is, when the moving floor 200 slides forward with respect to the vehicle while the upper clam shell T closes, the assistant links 320 are rotated, so that the assistant wheels 340 that are in contact with the ground are separated from the ground.

According to the vehicle with an expandable space of the present invention, as shown in FIG. 2 and FIG. 3, when the moving floor 200 is slidably inserted into the fixed floor 100, the assistant links 320 are mounted to be inclined downward toward the rear of the vehicle such that the assistant wheels 340 and a main tire axle M do not interfere with each other. Furthermore, when the moving floor 200 slides rearward thereof, the assistant links 320 are rotated and the assistant wheels 340 can come in contact with the ground.

The moving floor 200 is slidably inserted into the fixed floor 100 when the expanded space G is not performed. Furthermore, when the moving floor 200 is slidably inserted into the fixed floor 100, the assistant links 320 are mounted to be inclined rearward toward the rear of the vehicle such that the assistant wheels 340 and the main tire axle M do not interfere with each other. Accordingly, since the assistant wheels 340 and the main tire axle M do not interfere with each other, there is an advantage that there is no concern of damage therebetween. Furthermore, when the moving floor 200 slides rearward thereof, the assistant links 320 are rotated, so that the assistant wheels 340 come in contact with the ground. Accordingly, the moving floor 200 may be supported by the assistant wheel assemblies 300.

According to the vehicle with an expandable space of the present invention, as in FIG. 3 and FIG. 4, the assistant links 320 are coupled to the moving floor 200 through ball bearings B and may be rotated by a rotation of the ball bearings B.

In detail, a through-hole H is formed through a portion of each of the ball bearings B, and when the assistant links 320 are rotated with the ball bearings B and the assistant wheels 340 come in contact with the ground, coupling pins P may be fitted into the through holes H of the ball bearings B by sliding on the moving floor 200.

As described above, end portions of the assistant links 320 are coupled to the moving floor 200 through the ball bearings B. Furthermore, the assistant links 320 are rotated with rotation of the ball bearings B. When the assistant wheels 340 of the assistant wheel assemblies 300 are in contact with the ground, if the moving floor 200 keeps sliding, the assistant links 320 may be rotated by friction with the ground. Accordingly, to prevent the present situation, the coupling pins P are fitted into the through holes H of the ball bearings B by sliding on the moving floor 200. Accordingly, when the coupling pins P are fitted in the through-holes H, the ball bearings B cannot be rotated, so that the assistant wheel assemblies 300 are fixed. Accordingly, the assistant wheel assemblies 300 are fixed when the moving floor 200 is slid, so structural stability is improved. Furthermore, the assistant wheel assemblies 300 are fixed even though the vehicle is driven, so there is an advantage that the moving floor 200 is supported by the assistant wheel assemblies 300 when the vehicle is driven.

In an exemplary embodiment of the present invention, the moving floor 200 includes a groove 220 on the bottom of the moving floor 200 to from protrusions 240. End portions of the assistant links 320 are disposed in the groove 220 and coupled to the moving floor 200 through the ball bearings B disposed in the groove 220.

On the other hand, as in FIG. 6, according to the vehicle with an expandable space of the present invention, the assistant link 320 includes an upper link 322 and a lower link 324 and the upper link 322 has an end portion coupled to the bottom portion of the moving floor 200 and the other end portion inserted into the lower link 324. Accordingly, the lower link 324 slides by a rotation of the upper link 322, whereby a length of the assistant link 320 may be adjusted. That is, the assistant link 320 includes the upper link 322 and the lower link 324. An end portion of the upper link 322 is rotatably coupled to the bottom portion of the moving floor 200 and the assistant link 320 is rotated by a rotation of the upper link 322. The other end portion of the upper link 322 is slidably inserted into the lower link 324. The upper link 322 and the lower link 324 are fastened to each other in a ball nut structure, so that the lower link 324 may be slid by a rotation of the upper link 322. Accordingly, since the lower link 324 slides by a rotation of the upper link 322, a length of the assistant link 320 may be adjusted.

In detail, the lower link 324 may be a gas cylinder. Since the lower link 324 is a gas cylinder, when the assistant wheel 340 of the assistant wheel assembly 300 comes in contact with the ground, a length of the assistant link 320 may be varied, depending on the state of the ground. Accordingly, since a length of the assistant link 320 may be varied, there is an advantage that even if there are small prominences and depressions on the ground, the moving floor 200 may be slid without shaking.

As a result, a length of the assistant link 320 may be primarily adjusted by a rotation of the upper link 322 and may be secondarily adjusted by the lower link 324.

On the other hand, the vehicle with an expandable space according to an exemplary embodiment of the present invention may further include a separation panel 500 that, as in FIGS. 7 and 8, is mounted on the fixed floor 100, has a panel shape extending in the width direction of the vehicle, and slides forward or rearward with respect to the vehicle.

In more detail, the separation panel 500 slides rearward with respect to the vehicle when the moving floor 200 slides rearward thereof, being able to close the rear of the vehicle in cooperation with the upper clam shell T.

The separation panel 500 has a panel shape extending in the width direction of the vehicle and is mounted on the fixed floor 100. The separation panel 500 can slide forward or rearward with respect to the vehicle. The separation panel 500 can slide rearward with respect to the vehicle when the moving floor 200 slides rearward thereof. In the present configuration, when the upper clam shell T closes the rear of the vehicle, as shown in the figures, the separation panel 500 can close the rear of the vehicle in cooperation with the upper clam shell. Accordingly, even though the expanded space G is formed, the rear of the vehicle is closed by the upper clam shell T and the separation panel 500, so that the rear of the vehicle may be blocked from the outside thereof even though the vehicle is driven.

According to the vehicle with an expandable space of the present invention, when the moving floor 200 slides rearward and the expanded space G is formed, a moving seat S mounted in the internal space of the vehicle may be moved onto the moving floor. Since the moving seat S mounted in the internal space of the vehicle is moved onto the moving floor 200 and positioned in the expanded space G, as described above, there is an advantage that the spatial utilization of the expanded space G is maximized.

According to the vehicle with an expandable space of the present invention, it is possible to expand the internal space of the vehicle by expanding the vehicle body itself of the vehicle to the outside.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle with an expandable space, the vehicle comprising:
    a fixed floor being a floor of the vehicle;
    a moving floor slidably inserted into the fixed floor, being slid inside or outside the vehicle by operation of a driving unit, and forming the expanding space outside the vehicle by forming an outside floor connected to the fixed floor when sliding outward of the vehicle; and
    an assistant wheel assembly coupled to the moving floor, wherein the assistant wheel assembly include at least one assistant wheel that comes in contact with a ground when deployed and that separates from the ground when stowed.

2. The vehicle of claim 1,
    wherein the assistant wheel assembly further includes an assistant link,
    wherein the assistant link has a first end portion rotatably connected to a bottom portion of the moving floor and a second end portion fastened to the assistant wheel, and
    wherein the at least one assistant wheel is brought in contact with the ground by a rotation of the assistant link.

3. The vehicle of claim 2, wherein the moving floor slides forward and rearward with respect to the vehicle under an upper clam shell, and forms the outside floor connected to the fixed floor when sliding rearward of the fixed floor, to form an expanded space outside the vehicle.

4. The vehicle of claim 3, further including a lower clam shell which is coupled to a rear of the moving floor, has a panel shape extending in a width direction of the vehicle, and is configured to close a rear of the vehicle in cooperation with the upper clam shell when the moving floor is slidably inserted into the fixed floor.

5. The vehicle of claim 4,
    wherein a lower end portion of the lower clam shell is rotatably coupled to an upper end portion of a rear of the moving floor, and wherein when the lower end portion of the lower clam shell is rotated, the lower clam shell rotates rearward from the vehicle, forming the floor extending from a top portion of the moving floor.

6. The vehicle of claim 3, wherein, when the expanded space is formed, the moving floor slides rearward from the vehicle while the upper clam shell opens, and the assistant link is rotated, so that the at least one assistant wheel comes in contact with the ground.

7. The vehicle of claim 6, wherein, when the expanded space is closed, the moving floor slides forward with respect to the vehicle while the upper clam shell closes, and the assistant link is rotated, so that the at least one assistant wheel is separated from the ground.

8. The vehicle of claim 3, wherein, when the moving floor is slidably inserted into the fixed floor, the assistant link is mounted to be inclined downward toward a rear of the vehicle such that the at least one assistant wheel and a main tire axle do not interfere with each other, and when the moving floor slides rearward thereof, the assistant link is rotated and the at least one assistant wheel comes in contact with the ground.

9. The vehicle of claim 2, wherein the assistant link is coupled to the moving floor through a ball bearing and is rotated by a rotation of the ball bearing.

10. The vehicle of claim 9, wherein a through-hole is formed through a portion of the ball bearing, and when the assistant link is rotated with the ball bearing and the at least one assistant wheel comes in contact with the ground, a coupling pin is fitted into the through hole of the ball bearing by sliding on the moving floor.

11. The vehicle of claim 2,
wherein the moving floor includes a groove on the bottom portion of the moving floor to from at least one protrusion,
wherein an end portion of the assistant link is disposed in the groove and pivotally coupled to the moving floor in the groove.

12. The vehicle of claim 11, wherein the assistant link is coupled to the moving floor through a ball bearing and is rotated by a rotation of the ball bearing.

13. The vehicle of claim 12, wherein a through-hole is formed through a portion of the ball bearing, and when the assistant link is rotated with the ball bearing and the at least one assistant wheel comes in contact with the ground, a coupling pin is fitted into the through hole of the ball bearing by sliding on the moving floor.

14. The vehicle of claim 2,
wherein the assistant link includes an upper link and a lower link,
wherein the upper link has a first end portion coupled to the bottom portion of the moving floor and a second end portion inserted into the lower link, and
wherein the lower link is configured to slide by a rotation of the upper link, whereby a length of the assistant link is adjusted.

15. The vehicle of claim 14, wherein the lower link is a gas cylinder.

16. The vehicle of claim 3, further including a separation panel which is mounted on the fixed floor, has a panel shape extending in a width direction of the vehicle, and slides forward or rearward with respect to the vehicle.

17. The vehicle of claim 16, wherein the separation panel slides rearward with respect to the vehicle when the moving floor slides rearward of the vehicle, closing a rear of the vehicle in cooperation with the upper clam shell.

18. The vehicle of claim 3, wherein when the moving floor slides rearward and the expanded space is formed, a moving seat mounted in an internal space of the vehicle is moved onto the moving floor.

\* \* \* \* \*